Patented Dec. 15, 1925.

1,565,995

UNITED STATES PATENT OFFICE.

ABRAHAM L. FREEDLANDER AND WILLIAM G. GOODWIN, OF DAYTON, OHIO, ASSIGNORS TO THE RUBBER DEVELOPMENT COMPANY, OF DAYTON, OHIO, A TRUST ESTATE.

RUBBER COMPOUND AND METHOD OF MANUFACTURE.

No Drawing.    Application filed December 26, 1922. Serial No. 608,978.

*To all whom it may concern:*

Be it known that we, ABRAHAM L. FREEDLANDER and WILLIAM G. GOODWIN, citizens of the United States, residing at Dayton, in the county of Montgomery and State of Ohio, have invented certain new and useful Improvements in Rubber Compounds and Methods of Manufacture, of which the following is a specification.

Our invention relates to a rubber compound and its method of manufacture and adaptation.

The object of our invention is to provide a rubber compound and the resulting article of manufacture which, upon vulcanization will be resistant to acids, fumes, temperature changes, electric and static influences, and the like.

It is also our object to provide from such a compound an article of manufacture that will be approximately one-third the weight of the present hard rubber compounds known in the art, will have a strength comparative with the strength of the hard rubber known in the art and will be capable of being deformed without breaking while at the same time being capable of a certain degree of resiliency in the same manner that steel is resilient and is also capable of being deformed. The resulting article of manufacture and our method of producing it permits of the production of articles of the same predetermined characteristics so that uniform quality may be obtained in each article.

It is also our object to provide a compound which, when molded according to our process in connection with other articles such as steel, will adhere thereto and form a permanent union with such steel articles. It will also adhere to rubber compounds such as hard rubber articles.

The compound consists of the following ingredients:—

Smoke sheets of rubber, rosin oil, sulphur, ammonium bicarbonate, dehydrated lime, and ethyl-idene-aniline, and gas black.

It is preferred to mix these several ingredients in fifty to one hundred pound lots. The following is a description of the method of mixing and preparing this compound on the basis of a one hundred pound lot.

We take the smoke sheets of rubber and masticate them for fifty minutes according to the usual practice. In the place of the smoke sheets we may substitute fine Pará having the characteristics of great strength. We select 61 pounds and 12 oz. of such rubber.

It is essential that this rubber when finally made up be used before it is twenty-four hours old because after that time it begins to recover its resiliency.

When these smoke sheets are worked on the mill until plastic at which time they have achieved a temperature of approximately 130° to 180° Fahrenheit, the latter temperature being approximately the safety temperature, we add rosin oil to the extent of 1 pound and 13 oz. This is a softening and volatilizing agent. We then add sulphur by sifting it in slowly as the rubber is being worked on the mill. We use for this purpose 18 pounds and 6 oz. of the sulphur which is of the fineness to pass through a 300 mesh screen. The sulphur is used for the usual purpose in compounds for promoting the vulcanization. Thereafter while the mixing is taking place the dehydrated lime which has been ground as fine as it is possible to secure it is incorporated in the mass to the extent of 3 pounds and 1 oz. The lime is used to toughen the compound and accelerates the reaction between the rubber and the sulphur. We then add 1 pound and 8 oz. of gas black for the purpose of giving color and some body to the mixture, but this may be omitted.

In the meanwhile, the ethyl-idene-aniline has been heated in a steam jacketed kettle to about the temperature of boiling water, that is to about 212° Fahrenheit. We then dip this out of the kettle and incorporate 1 pound and 4 oz. thereof in the mixture in the mill. This acts as an accelerator to the reaction and adds tenacity to the resulting compound.

The last ingredient added is the ammonium bicarbonate to the extent of 4 pounds and 12 oz. This is added to give the spongy or aerated character to the compound. It is added last because the heat of mixing in the mill would volatilize it if added earlier in the process.

It is essential that this compound be molded and vulcanized or blown within twelve hours after it has been mixed. The preferred practice is to mix fresh batches each day.

The temperature of the room in which it is kept and in which it has been mixed should be approximately 70° Fahrenheit.

When it is desired to mold this compound into finished articles it is placed in a metal mold which is jacketed for receiving steam under pressure and cold water. The compound is put in the mold and a mandrel is inserted about which the compound is to be molded or the article itself on which the compound is to be molded may be inserted in the mold, or both.

The mandrel is sometimes used to hold the article in position while the compound is molded or blown.

The term "blown" is used because, when the heat is applied to the mold, the compound expands and very great pressure is set up in the mold during this molding process. This results in the compound having a porous appearance.

In preparing the mold the space between the mandrel and the article about which the compound is to be molded is approximately half filled with the compound allowing the other half of the area for the expansion of the compound during the molding process.

In some cases where it is desired to have a soft rubber coating on the resulting article the mold is lined wth a soft rubber sheet. It is preferable to cement this sheet to the inside of the mold. The sheet itself is about one-sixty-fourth of an inch in thickness.

When the mold is closed the steam is turned on and the mold is kept under heat for one hundred thirty-five minutes approximately. About one-third of this time in the beginning of the molding process the pressure of the steam is being gradually increased until it reaches a maximum of eighty pounds. The remainder of the time the steam is held at an eighty pound pressure. At the end of the period the steam is cut off and cold water is circulated through the mold to chill it and when it has been cooled the mold is opened, the mandrel is extracted and the finished article is thus completed.

These times are approximate depending upon the exact character of the resulting material desired. The time may be varied from fifty minutes to one hundred thirty-five minutes by varying the quantity of lime and ethyl-idene-aniline. The larger the quantity of such agents the less time needed.

It will be understood that these quantities are approximate and some variation is possible. The resulting product formed will have a porous but relatively stiff interior, an impervious portion adjacent said interior portion and a relatively resilient exterior.

It will also be understood that some variation in time, temperature and quantity as well as substitution of materials of the same characteristics and reactions are contemplated.

Having thus fully described our invention, what we claim as new and desire to secure by Letters Patent, is:—

1. In combination, rubber, rosin oil, sulphur, ammonium bicarbonate, lime, and ethyl-idene-aniline.

2. In combination, rubber, rosin oil, sulphur, ammonium bicarbonate, lime, ethyl-idene-aniline, and gas black.

3. In combination, rubber, 61 pounds and 12 oz., rosin oil, 1 pound and 13 oz., sulphur, 18 pounds and 6 oz., ammonium bicarbonate 12 pounds, 4 oz., dehydrated lime, 3 pounds and 1 oz., and ethyl-idene-aniline, 1 pound and 4 oz.

4. In combination, rubber, 61 pounds and 12 oz., rosin oil, 1 pound and 13 oz., sulphur, 18 pounds and 6 oz., ammonium bicarbonate 12 pounds, 4 oz., dehydrated lime, 3 pounds and 1 oz., ethyl-idene-aniline, 1 pound and 4 oz., and gas black, 1 pound and 8 oz.

5. In combination, smoke rubber sheets thoroughly masticated, finely ground sulphur, finely ground lime, rosin oil, ethyl-idene-aniline and ammonium bicarbonate.

In testimony whereof, we affix our signatures.

ABRAHAM L. FREEDLANDER.
WM. G. GOODWIN.